Oct. 15, 1963        P. ACLOQUE        3,107,196
HEAT TREATMENT OF GLASS AND PRODUCT
Filed Oct. 14, 1959        3 Sheets-Sheet 1

INVENTOR.
PAUL ACLOQUE
BY
Bauer and Seymour
ATTORNEYS

United States Patent Office 3,107,196
Patented Oct. 15, 1963

3,107,196
HEAT TREATMENT OF GLASS AND PRODUCT
Paul Acloque, Paris, France, assignor to Compagnie de Saint-Gobain, Paris, France
Filed Oct. 14, 1959, Ser. No. 846,382
Claims priority, application France Apr. 21, 1951
13 Claims. (Cl. 161—164)

This invention relates to a process for improving the mechanical qualities of glass by modifying the internal stresses which have developed therein. In particular, it produces glass having those qualities which are usually imparted by an annealing treatment, more especially, the property of being easily cut. The invention includes the production of stressed glass which can be cut.

The invention is particularly applicable to that glass which is technically called flat glass even though its shape is curved or undulated or of any other desired form and it has its most valuable application in the continuous production of sheet glass.

It is known that the object of the annealing treatment is to relieve the glass of the permanent stresses which may be set up therein and which are often irregularly distributed. That treatment consists in first maintaining the glass object throughout its mass at a homogeneous temperature higher than that of the "strain point," the strain point, it is accepted, corresponding to a viscosity of the glass of $10^{14.6}$ poises, and then cooling the glass object very gradually to below the temperature of the strain point. That treatment, called "annealing" necessitates a large and costly installation of apparatus, a long time to carry the annealing into effect, and produces results that are not always satisfactory.

The "points" of glassmaking as established by authorities, are as follows, it being noted that some of the points are actually ranges.

Softening point poises, $10^{7.65}$ (Littleton, 2,311,846, Feb. 23, 1943, "Littleton softening points," elongation of glass fiber, Br. pt. 440,872 and 482,814, also Bulletin Institut du Verre, September 1946, p. 18, 19, 20, chap. III)

Deformation point, $10^{11}$–$10^{12}$ poises (Chap. II, p. 17, résumé p. 16, same "Bulletin")

Upper annealing, or Tg, or annealing, or transformation, $10^{13.4}$ poises (FIG. 1, FIG. 21, "Bulletin" above, p. 17, p. 27, Journ. Soc. Gl. Tech., December 1944, pp. 432, 462).

Equivalent temperature for ordinary glass, 534° C.

Strain point, $10^{14.6}$ poises; lower annealing or Ti point, $10^{16}$–$10^{17}$ poises (Littleton U.S. Patent 2,311,846)

Equivalent temperature for ordinary glass 420°–430° C. (FIG. 1, p. 17 (col. 2), p. 18, same Bulletin, FIG. 21)

These points are usually given in poises because the temperature at which the points occur varies with glass compositions.

It is an object of this invention to eliminate or greatly reduce the apparatus necessary for producing glass having properties usually associated only with annealing. Another object is to eliminate annealing or greatly reduce the time required for producing glass having desirable annealed properties but in other respects superior to annealed glass. Another object is to reduce the capital investment for making glass and the cost of glass manufacture.

An object is to produce stressed glass that can be cut, and to produce it easier, with less machinery, and faster than it can be annealed.

Another object of the invention is to provide a highly stressed (tempered) glass in which the sensitivity to penetration is reduced by increasing the thickness of the compressed layer while retaining in the glass its desirable quality of fragmentation into small particles on breaking.

Another object is to produce a stressed glass in which the surface is under compression and two maxima of compression occur inside the surfaces.

Another object is to produce a stressed, partly inverted glass in which the surface is under tension and two maxima of compression occur inside the surfaces.

Another object is to produce from glass of any given formula, several new stressed glasses having different, distinguishable properties, by a method based upon a novel heat treatment.

The process according to the present invention is based on an entirely different principle, than that of annealing, which will be described hereinafter.

Glassmakers distinguish between permanent and temporary stresses in glass. The permanent stresses in glass that is to say, those persisting in the glass when it is cold, can only develop if, at the commencement of the cooling step, the glass is wholly or partially at a temperature sufficiently high for its different molecules to have a certain freedom of movement relatively to one another, that is to say, a temperature higher than the strain point above which the entire mass of glass must be brought in order to undergo the customary annealing treatment. The annealing treatment usually begins at the upper annealing point, and ends at handling temperature, near atmospheric.

When the glass is cooled from an initial temperature at which it has already completely solidified, that is to say, below the strain point at which the molecules thereof are no longer able to move relatively to one another, it is found that the stresses, which arise because the outer layers are cooled more rapidly than the inner layers, are only temporary and disappear at the same time as the difference in temperature which caused them.

On the contrary, when the glass is cooled from an initial temperature above the strain point at which slipping of the molecules relatively to one another is possible, it is found that the glass is the seat of permanent stresses once it is cooled to ambient (atmospheric) temperature, these stresses being the higher, the more rapid the cooling has been before passing through the tension temperature or strain point. Annealed glass is never entirely free of stresses but is about the mildest of stressed glass with a surface compression between 0 and about ¾ of a fringe per cm. of glass traversed by the light rays. Glass cooled in free air is more stressed and its surface compression is generally not above 2 fringes whereas high tempered glass for vehicle glazings and windshields use is among the more strongly stressed glasses with a surface compression above 4 fringes. Free air cooled glass is not satisfactory for cutting.

Although the term "slipping" and "slip" are to be interpreted in their most general sense of displacement of the glass molecules relatively to one another, an idea of the phenomenon can be obtained by imagining that the skin of the glass object, when contracting while the core is still mobile, has been able to slip on the said core, but, on the contrary, the core, when solidifying in its turn and tending to contract, cannot enjoy the same facilities since the solidified skin is unable to follow it in its contraction and puts the core under tension, thereby bearing on the skin and placing it under compression.

This phenomenon can be viewed and photographed through an instrument called the Babinet compensator which acts by polarized light passing through test pieces parallel to their lateral faces.

I have discovered that, since the slipping due to the contraction of the surface layers in the first phase of the cooling is the origin of the permanent stresses which affect the cold glass, it is possible to vary the ultimate values and distribution of these stresses by applying a treatment, after said slipping has occurred, which is capable of causing slipping in the opposite sense, that is to say, slipping due to dilatation of the surface layers, said dilatation corresponding to the placing of the surface layers in compression. I have also discovered how to control this phenomenon so as to produce glasses of different properties as well.

The invention accordingly includes the step of developing in the surface layers of glass which has been brought below the strain point, a state of compression sufficiently intense to produce at least a partial slipping of the external layers on the internal layers.

The invention includes a process of applying to the external layers of the glass, at a time when the temperature of the internal layers is lower than the strain point, or does not appreciably exceed such temperature, a heat blast (for example a blast of flame) which is sufficiently intense to generate stresses in these external layers, by thermal expansion, which are capable, having regard to the state of the glass at the moment of treatment, of causing the slipping of these external layers with respect to the relatively more rigid internal layers. Moreover, this blast must be sufficiently short to ensure that the internal layers will not be brought to a temperature substantially higher than the strain point. This intense and short application of heat is wholly different from the long drawn out, carefully graded reduction of temperature that constitutes the essence of annealing.

I have demonstrated that, owing to the short duration of the treatment and the resulting temperature, the slipping produced is irreversible, the subsequent cooling does not cause reverse slippage, and therefore no special precautions are necessary during cooling except, of course, those which are normally required in order to avoid breakage resulting from temporary stresses. The long process of cooling characteristic of annealing is unnecessary.

I have also demonstrated that it is possible to carry out the treatment without bringing the surface layers, at any time during the treatment, to a temperature at which they could be altered by the contact of the means usually utilized for supporting the glass. In other words, the heating is ended before the surface of the glass reaches the deformation point.

The process according to the invention, which may be applied equally well to glass objects already manufactured and to those in course of manufacture, thus renders it possible to modify with the aid of very simple means the permanent stresses created or to be created in these objects in order to decrease, remove or even reverse the said stresses. It is a particularly interesting advantage of this process that it is possible to treat finished objects, there being no danger of the surfaces thereof being altered by the treatment. In particular, it is possible to apply the process to patterned glass, or to drawn glass for windows.

This application is a continuation in part of Serial No. 282,449, filed April 15, 1952, and of Serial No. 391,636, filed November 12, 1953, both now abandoned. In the parent case the applicant has described in its general aspects a process which can be used to change the value and the distribution of the permanent strains in a glass object by inducing in the superficial layers of the object slipping or gliding movements in a direction opposite to those which occurred at the beginning of its cooling while the molecules of glass were still provided with the ability to move with respect to each other. This process enables one to impart to glass those qualities which are habitually sought by annealing, among which is the property, in particular, of being easily cut.

A method of carrying out the invention described in the parent case involves applying to the external layers of the glass, while the temperature of the internal layers is lower than the strain point or does not exceed it notably, a blast of heat sufficiently intense to establish in the external layers, by thermal expansion, compression strains capable, having regard to the state of the glass at the moment of treatment, of inducing the gliding of the external layers on the internal layers which are relatively more rigid, this blast of heat being, especially, sufficiently short to prevent the internal layers from reaching a temperature notably above the strain temperature; after this treatment, cooling requires no other precaution than those which are necessary to prevent the breakage resulting from temporary strains which arise during cooling.

In the practical application of the invention the glass which is to receive the treatment may be glass which, after issuing from a furnace, has been cooled throughout below the strain point as it is progressing, or it may be finished glass resulting from some former process. If cold glass is used it is usually heated to a temperature somewhat below the strain point before applying the blast of heat, in the interests of thermal efficiency and yield, and for reducing the risks of breakage, but the process can be applied to colder glass. A particular state of glass to which the process is advantageously applied is that in which there are moderate stresses, as shown by the displacement of fringes in a Babinet compensator if viewed through the cross section of a fragment, of such magnitude that the glass cannot be cut along a predetermined line. Glass cooled in free air has a moderate temper and generally cannot be safely cut along a predetermined line due either to a too great irregularity of the distribution of the stresses, or to a too great compression in surface, or a too great extension in the internal layers. For glasses cooled in free air the stress line in the compensator has the shape shown in FIG. 1, and in certain cases the ends of the stress line may show about 1 to 2 fringes of compression at the surface per cm. of glass traversed by the light. High temper glass can show as much or more than 8 fringes of compression. The process can also be applied to such highly tempered glasses.

When applying the process of the invention to high or low tempered glasses, products can be obtained which have the common characteristics which disclose their origin and their distinctive qualities, two maxima of compression located inside the surfaces of the sheet. As viewed in the compensator in cross section this distinctive curve is clearly visible and examples of it are found in FIGS. 2 and 3. In tempered glass the maxima are at the surface and in annealed glass, which can never in practice be entirely unstressed, the maxima of little value are also in surface.

The present invention concerns not only the foregoing problems, but those additional problems arising from the application of the new process to a sheet of glass issuing continuously from a melting furnace, regardless of whether this sheet is destined ultimately to undergo a surface working such as grinding, polishing or the like or whether it is produced initially in its ultimate form. The applicant has discovered that the treatment may be applied to such moving sheets without bringing the surface of the glass at any moment to a temperature such that it would be capable of being marred or otherwise altered by contact with the usual means for supporting it.

Generally speaking, the applicant has discovered that a sheet of glass extracted from a melting furnace, for instance by drawing or by rolling, may have an irregular distribution of the temperature on its surface when the cooling of the sheet is effectuated in the free air and even when upon issuing from the furnace, it passes through apparatus designed to produce a controlled cooling. Controlled cooling, for instance, by blowing the faces of the hot sheet, after it issues from the furnace, with air under mild or moderate pressure, tends to produce glass having less irregularity of temper, viewed perpendicularly to the face of the sheet, than glass cooled in the free air. However, in wide sheets, even controlled cooling may leave stresses between one part of the sheet and another greater than ¼ fringe. Where such stresses exist cutting is attended with grave risk of breakage and steps should be taken to reduce the unbalanced, face viewed stresses to less than ¼ fringe. This invention includes means to effect this correction. It is to be observed, especially, that irregularity of temperature on the surface of the sheet is capable of producing temporary or permanent deformations in the sheet. For instance, a sheet when cooled to air temperature may at first have a certain concavity, which reverses itself as cooling becomes complete, presenting an inverse curvature at the end of the cooling process.

When one examines any sheet of glass under the Babinet compensator, existing stresses reveal themselves. Examination may be endwise, parallel to the surfaces (the major surfaces or faces) when it fragments or it may be in plan, that is to say, perpendicular to the faces. If the irregular stresses visible in plan amount to more than ¼ fringe and if the object is to produce a glass that can be cut, as by diamond point or scribe, and broken along the cut perpendicularly to the surfaces, the stresses in plan should be levelled off and reduced before cutting is attempted. This process provides a means for reducing irregularity of stresses, for producing glass with uniformity of stresses, and for producing glass with novel stress patterns when viewed endwise of selected magnitudes.

The control of irregular cooling of a moving glass sheet can take place in several ways: shields can be placed adjacent those areas which tend to cool too swiftly, thus retarding their cooling and equalizing their rate of cooling with portions that cool less rapidly; controlled forced cooling, as by means of air blown against the faces of the sheet until its temperature falls wholly below the strain point; and introducing into the heat blast characteristic of this process differences of temperature which compensate for excessive differences existing across the sheet. The latter method is aided by the fact that each glass manufacturing apparatus tends to set up a persisting temperature pattern in the formed sheet, which enables one to compensate by a fixed position hot gas heater, as hereinafter described. Anyhow means are provided to permit regulation when necessary in the course of the operation. Combinations of the three named methods of compensating for irregular cooling can also be used.

The present invention involves a process of applying the intense and brief heat treatment described above to the sheet by selecting the points of application of the heat, and the intensity of the heat, as a function of the distribution of temperatures in the surface of the sheet and also as a function of the deformations of the sheet.

The inventor has established that in the surface of a sheet of glass issuing from a melting furnace, the temperature will probably not be uniform when taken along a straight line perpendicular to the direction of movement of the sheet and, furthermore, may not be the same at a single location on opposite faces of the sheet. In other words, if one traces at a given time the isotherms in the surface of the sheet at a selected place, they will probably not be found to be straight lines perpendicular to the direction of displacement of the sheet, but rather curves, frequently irregular curves, and an isotherm in one of the faces of the sheet is not necessarily superimposed on the isotherm of identical temperature on the other face.

In particular, if one permits the faces of the sheet to cool in the free air, that is to say naturally, it has been established that the isotherms are curves turning their concavity toward the furnace mouth, because of the more rapid cooling which occurs along the edges.

The invention generates in the surface of the sheet strains sufficiently strong to enable the particles of superficial layers, provided with the mobility introduced by the blast of heat, to glide or slide on the immovable particles of inner layers or core so that the mutual stresses are partly released and changed in character.

When it is desired to obtain uniform treatment of such a sheet, for example take the case of a plain sheet without deformations, the line of application of the heat may be an isotherm, and the intensity of heat applied will then be uniform. However, it is equally possible to apply the blast along a line of action which does not correspond to an isotherm, the intensity of the blast applied to different points varying in order to compensate for the inequality of temperature in the sheet along the line of application of the heat.

The heat will be applied transversely to the sheet in a zone that is relatively restricted along the length of the sheet, due consideration being taken of the speed of movement of the sheet, so that the action of the heat will be limited to a term sufficiently brief to satisfy the conditions of application. For sake of simplicity of presentation on the drawings, the zone of the sheet to which heat was applied has been represented by its median line, which is called the line of application of heat.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

High tempered glass, resulting from a very rapid cooling of glass from a temperature near its deformation point, has mechanical properties of strength and resistance. High tempered glass, when broken, breaks into small and inoffensive fragments like small cubes. Because of its properties, tempered glass has been used in positions where shock must be resisted which annealed glass is incapable of sustaining and when inoffensiveness in case of breaking is required. Its greatest use is for automobile windows and television implosion plates. When an automobile travelling at high speeds is struck by a piece of gravel projected from under the tire of another car the blow may be severe enough to disrupt the glass and obscure the vision of the driver if the glass is used as a windshield. I have now discovered that improved resistance to such shocks is imparted by the present invention which can be applied to high tempered glasses to reduce their fragility to penetration by pointed objects while retaining their improved strength and their capacity to shatter into small inoffensive fragments.

The tempering of a glass sheet introduces stresses of high compression at the surface and balancing stresses of high tension into the core of glass. When the stress curve is parabolic which is generally the case, the maximum of compression at the surface is twice the maximum tension at the core and the thickness of the layers under compression is independent of the intensity of compression. In fact, the thickness of the compressed layer of tempered glass is about .42 of the half thickness of the glass. For a glass ¼ inch thick, the thickness of the compressed layers is about 1.3 mm.

When the process of this invention is applied to high tempered glass, the thickness of the layers under compression is increased.

*Example I*

High tempered glass having a surface compression greater than 6 fringes per cm. of glass traversed by the light, was heated throughout to about 450° C., which is below the strain point, and was then passed through a blast of flame of sufficient intensity to impart to the glass between 5 and 30 cal./cm.²/sec. After 2 seconds' exposure of a sample of such a high tempered glass to a flame capable of imparting to the glass 10 cal./cm.²/sec., the heating was stopped and the glass was cooled quickly in a few seconds to about room temperature. The changes introduced by the treatment did not reverse themselves, leaving the changed stresses fixed in the glass. Upon examination by compensator and polarized light, it was shown that the layer under compression had been increased to .45 of the half thickness of the glass, representing an increased thickness of 7.5% for that layer. This increased thickness materially improved the resistance of the glass to shattering under the impact of a sharp object, because of the greater thickness of the compression layer. It was also observed that no substantial change had occurred in the depth of the tension area (the value of maximum tension). The stress curve had taken on the shape which is characteristic of the novel glass produced by this process, a curve in which the two maxima of compression occur inside the surfaces of the glass. The intensity of compression of these maxima was slightly more than 3 fringes. The compression at the surfaces was approximately a half fringe less than this maximum. When fractured, such glasses have produced the ordinary inoffensive fragments.

*Example II*

A sample of mildly tempered glass was heated to 450° C. below the strain point, and was then blasted by a flame such as is described in Example 1, being thereafter cooled without regard to anything except the necessary precautions to avoid breakage under the action of those fugitive temporary strains which arise and disappear below the strain point. At the temperature of treatment, the compression at the surface was 1½ fringe. It is to be noted that a compression of 1½ fringe per cm. of glass traversed by the light is about 330 kg./cm.².

At the end of a treatment of 1 second the heating was stopped and the glass was cooled without regard to anything except the necessary precautions to avoid breakage under the action of temporary strains. The characteristic stress curve having 2 maxima of compression inside the surfaces of the glass was present. The tension at the center had not changed materially and was about ¾ of a fringe. The surface compression was about 1 fringe.

The same treatment was applied on another similar sample but the blast of flame was applied for 1½ seconds. This reduced the maximum of extension in the middle of the glass to about 0.55 fringe whilst the two maxima of compression were about ¾ of a fringe and the compression at the surfaces about ¼ of a fringe.

This glass, while still a stressed glass, could be cut like annealed glass and would break cleanly perpendicular to the faces along the line of the scribe.

The same treatment was carried out but the blast of flame was applied for 2 seconds. This reduced the maxima of compression inside the glass to about ½ fringe, reversed the surface compression to about ½ fringe of tension and provided about ½ fringe of tension at the core.

When a similar test was carried out by heating for 3 seconds in the flame the central tension was reduced to about .333 fringe the tension at the surface approached 1 fringe and the maxima of compression were at about ½ fringe. By continuing the treatment for about 5 seconds the maxima of compression were at about 1 fringe, the center was about null and the surfaces were at about 2 fringes of tension.

In order for stressed glass to be cut similarly to annealed glass, the following conditions should be met: the degree of extension whether at the surface or in the core should not materially exceed an amount of ½ fringe per cm. of glass traversed by the light; the compression in the surface, if any, should not substantially exceed 1 fringe per cm.; and the strains between two neighbouring zones observed in plan through a beam of polarized light perpendicular to the faces of the glass, should not substantially exceed ¼ fringe per cm.

The foregoing values are exact for glass 6 to 8 mm. thick. For other thicknesses some allowance should be made. The several types of glass which can be produced by this method are readily distinguishable by their properties, as described above, and by their uses. As to use, the glasses made from high tempered glass are useful where penetrating shocks are to be withstood. The cutable glasses are to be used where glass is cut on the job and can be stronger than annealed glass.

The glasses are readily distinguishable and quite different in properties from the glasses from which they are made.

The process is highly flexible and can precisely impart desired properties to glass by changing the duration of the blast from about one to several seconds. Those burners giving 1 second of exposure to the surfaces of the glass may be followed by other burners giving like exposure placed in spaced relation to each other. It may be useful in some cases to space the burners from each other so that the hot surfaces have a chance to cool slightly and if necessary below the strain point or to a temperature not exceeding it substantially before the second impact of heat.

*Example III*

A furnace and its accompanying sheet forming apparatus both of which were of classical type issued a continuous glass sheet of window glass composition 5 mm. thick, 40 cm. (15 inches) wide at a speed of 3.1 m./min. In order to bring the temperature of the glass quickly below the strain point, the glass was blown mildly on both sides by a series of slot-type nozzles operating at an air pressure of several inches of water. In a sheet of this width accompanied by forced cooling applied to all the surfaces the use of baffles or differential heating was unnecessary. After reaching a temperature about 450° C. the glass had a stress curve showing greater temper than that of free cooled glass. It was passed between two gas burners the consumption of which was carefully regulated. The consumption of gas was 6 kgs. per hour developing a total heat of 20,000 cal./sec.

divided between the two burners. The surface of the glass which passed in 1 second through the flame was 215 cm.², The quantity of heat furnished by the burners per second and per cm.² of the glass was thus $$\frac{10,000}{215}$$

which is 46.5 cal./cm.²/sec. per burner. It is to be noted that this quantity is not totally efficacious, and that only a certain amount is actually used by glass, the rest being wasted in ambiance. Nevertheless it can be pointed out that the efficiency of flame heat in this operation is about 7 times as great as the efficiency of radiant heat, such as is found in a furnace. The preferred method of heating the glass is contact with flame or with some other hot gas so that the transference of heat is by contact of the gas with the surface and transference inward by conduction through the body of the glass which, being a good insulator, does not conduct very rapidly.

In industrial operations, we have indicated that satisfactory operations can be carried out with 4 cal./cm.²/sec. actually absorbed by glass but that below that figure efficiency fails.

After leaving the burners, the rapidly moving sheet was passed between a series of oppositely disposed slots which blew the surfaces of the glass with air under mild pressure of several inches of water. The heat blasts had raised the temperature of the surfaces above the strain point and approaching the deformation point without reaching the latter. The center or core of the ribbon did not pass the strain point. The cooling after the flames did not temper the glass. The gliding movements in the glass surfaces which were induced by the blasts of heat were irreversible. This made it possible to dispense with the annealing furnaces and the close cooling control which would have been necessary. After the blowers had reduced the temperature of the glass so that it approached room temperature, an automatic scribe passed over the length of glass and scored the surface at right angles to the edges. Slight pressure applied below each score broke the glass cleanly and perpendicular to its faces. The glass thus produced was slightly stressed glass having 2 maxima of compression inside the surfaces, the surface compression being less than ¾ of a fringe per cm. of glass traversed by light and maximum tension at the core not substantially over ⅓ fringe (per cm. of glass traversed by light).

In other commercial installations where a wide sheet was made, the edges of the sheet cooled so much faster than the center portion of the sheet that the glass ran serious risk of shattering when cut. In order to reduce the strain pattern viewed perpendicularly to the faces of the sheet, shields were placed over the edges of the glass of such size and proximity as to restrain the cooling of the edges of the sheet to a rate commensurate with that of the center. The use of these heat reducing baffles must be worked out in detail for each installation because it is rare that two installations have the same cooling characteristics. In general, the system is to arrange the baffles over the edges and gradually extend them inward until a rough approximation of an isotherm, that is a band of roughly uniform temperature, extends across the moving sheet below the shields. It is to this isotherm that the blasts of heat are more conveniently applied. These and other means of attacking the same problems will now be described.

Figures 9, 10:
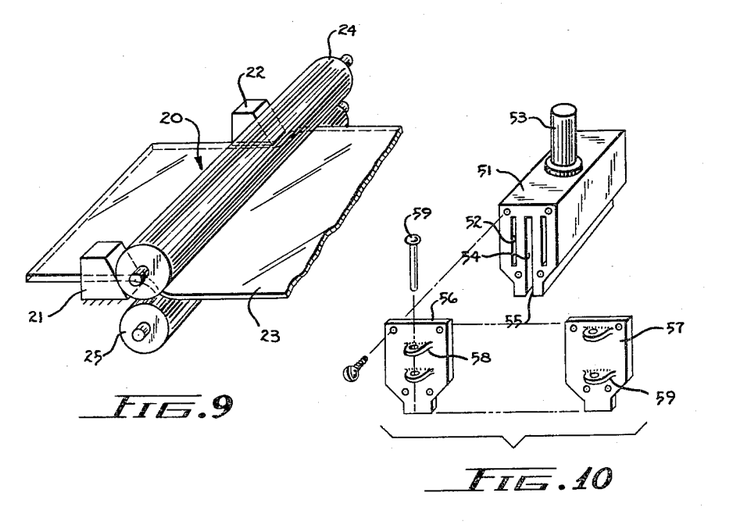
FIGURE 9 is a schematic perspective of the treatment by a standard method as the glass is rolled from the furnace and FIGURE 10 is a dismantled view of a heater unit.
Figure 11:
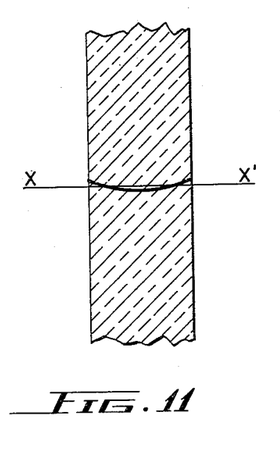
FIGURE 11 represents the stress curve of annealed glass having compression stress at the surfaces, of less than ¾ of a fringe.
Figure 12:
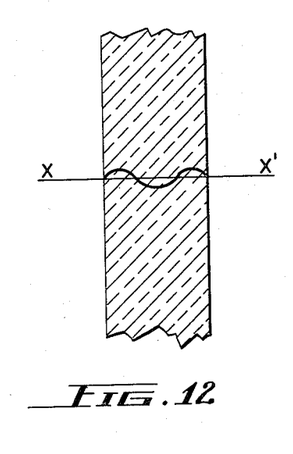
FIGURE 12 represents the stress curve of novel glass having nul tension at the surface, maximum tension at the center, and two maxima of compression between the center and the surfaces.
Figure 13:
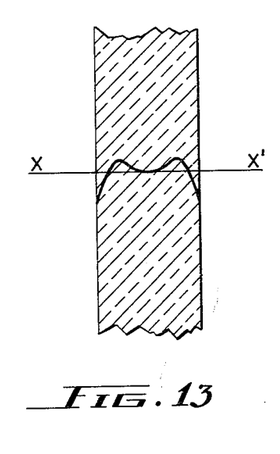
FIGURE 13 represents the stress curve of novel glass having maxima of tension at the surface, nul stress at the center, and two maxima of compression between the center and the surfaces.
Figure 14:
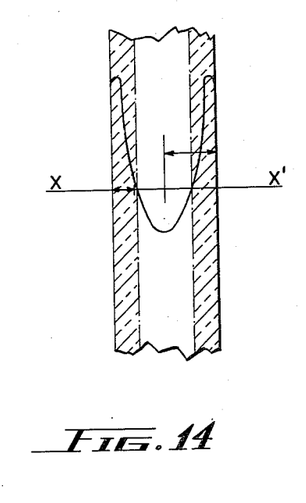
FIGURE 14 is a diagram of novel glass showing a compression layer thicker than 0.42 of the half thickness of the glass. Such glass has increased resistance to shattering when penetrated by a sharp object. The thickness of the compression layer can be readily determined, but is not usually visible to the naked eye. This type of glass includes novel highly tempered glass having this improved characteristic, as well as some forms of the new glass which have this advantage as well as the double humped stress curve which is its outstanding characteristic.

In FIG. 9, 20 is the discharge orifice of the furnace, and 21—22 are cheek pieces that confine the glass laterally. The glass 23 passes between two rollers 24—25 which produce the sheet. The borders of said sheet have a tendency to cool faster than the center in the air, the center being hotter than the edges. It is not difficult to locate the isotherms on the sheet, using thermocouples or other high temperature measuring devices suspended in proximity to its surface, and the shape of the isotherms is frequently irregular, and on the occasions when they are not irregular they are usually of such curvature as to offer a difficult obstacle to the successful application of the new process.

It is a part of the invention to apply the heat treatment to a sheet of glass, the cooling of which has been controlled in advance by means of heat insulating screens or baffles disposed along the borders of the sheet or by using if necessary a localized reheating, particularly applying it to the borders, when they are cooler than the center of the sheet. It would be desirable to produce an isotherm lying straight across the sheet, as it would simplify the apparatus for applying the heat treatment, but such an isotherm is an example of theoretical perfection as the invention can be applied successfully to any isotherm. However, the preliminary regularization shortens and smooths out the isotherms, regularizes them, and simplifies the application of the blast of heat. The apparatus for preheating may be of different sorts and two of them are illustrated in combination in FIG. 5. Either of them may be used alone for preheating or they may be used together as shown. If both faces of a sheet of glass in movement cool at the same rate, they may be exposed to identical heat treatments symmetrically applied. On the contrary, when the two faces of the sheet cool differently, one may reestablish by any appropriate means the thermal symmetry of the two faces before applying the heat treatment of the invention, thereafter applying the symmetrical treatment to both faces.

Such means as are described generally in the preceding paragraph may be used for this purpose. For example, one may apply, over the face which has cooled the more quickly, an insulating screen which tends to delay the cooling of the sheet or to make it cool evenly from edge to edge, or, in the alternative, auxiliary means of heating may be applied to such locations, and only for such periods of time, as are necessary to establish the thermal symmetry of the sheet.

Figure 5:
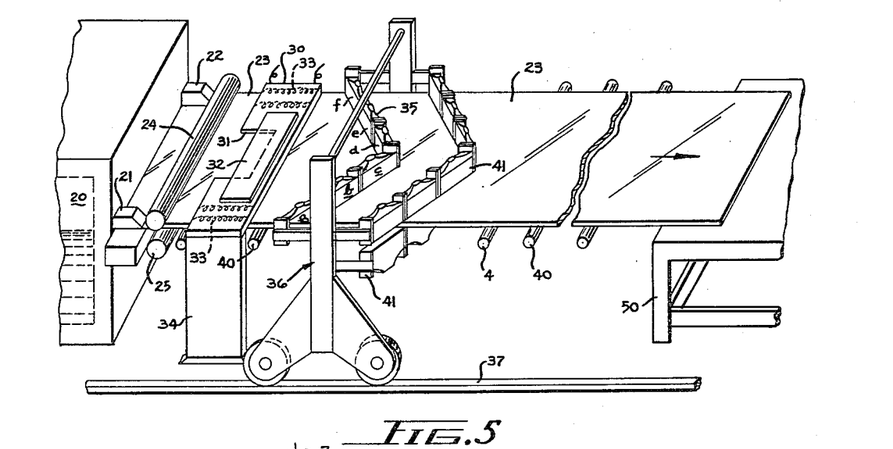
FIGURE 5 is a schematic perspective view of an apparatus for applying the invention to a glass sheet being continuously emitted by a furnace.
Figure 6:
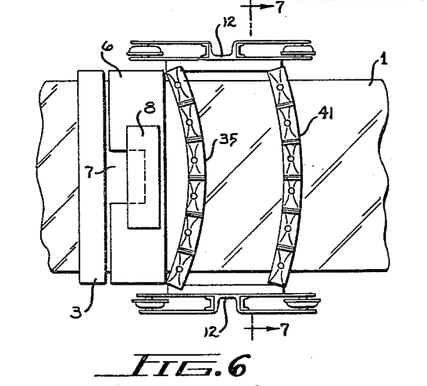
FIGURE 6 represents a plan view of the schematic installation.

The sheet of glass 23, as indicated in FIG. 5, issues horizontally from between the rollers 24, 25 in its correct width and thickness. An insulating screen 30, for example of asbestos, having a centrally located cut-out portion 31 overlies the rapidly cooling upper surface of the sheet and acts to regularize the cooling by retaining the heat in the sheet. This insulating screen has the effect of permitting, because of its cut-out portion 31, the central portion of the sheet to cool rapidly, while the greater extent of the screen at the borders tends to retain the heat and thus to regularize and flatten the curve of the isotherm from edge to edge of the glass. Furthermore, as in this kind of horizontal rolling, the underside of the sheet is able to be cooled less rapidly than the upperside, another effect of the insulating screen is to allow both sides to cool at a rate more similar. A movable auxiliary screen 32 can be moved by increasing amounts over the cut-out portion 31 of screen 30 thus regulating the rate at which heat is permitted to escape from the central portion of the sheet. By locating the temperature testing instruments beyond the screen 30, it is possible to use the screen to regularize the isotherm, by flattening its curve and simplifying its shape. In some cases, a simple screen such as has just been described is insufficient to prevent the edges of the glass sheet from cooling at a faster rate than the center, and in these cases the screen may be provided with electrical heating elements 33 in the edges of the screen. By turning these heating elements on, it is possible not only to prevent the heat from escaping or to reduce its rate of escape, but also to impart additional heat to such portion of the sheet as require it. Although the heaters are shown located in the borders of the screen, they may be located in whatever part of the screen as necessary to produce an isotherm of reasonably simple shape. The screen is mounted on standards 34 so that it does not engage the surface of the glass and these standards may be moved along the path of the sheet to whatever position is chosen.

An apparatus for accomplishing reheating of the glass, which may be used alone or in combination with the screen which has already been described, is also shown in FIG. 5 and is a flame burner 35 which extends from edge to edge of the glass sheet and is composed of six independent burner units a–f attached to each other by articulations which allow vertical and horizontal, pivotal displacement of burner sections relative to neighboring sections. The units a–f are individually supported (not shown) and individually supplied through pipes 60 and valves 61. Thus, the units are adjustable with regard to the amount of heat which each emits. Having determined the location of an isotherm, in sheet 23 as it leaves the rollers or the screen, this heater is suspended over the isotherm and the heat is applied to the glass in such a manner as to produce the effect hereabove mentioned of equalizing the temperature of both sides of the sheet and by this means, reducing the casual deformation of the sheet as will be explained hereafter.

The apparatus 35 may be suspended from a frame 36 which runs on tracks 37 alongside the progressing sheet and which can be moved to any desired location along that sheet. It is again pointed out that the screen-type of reheater may be used alone, or they may be used in combination with each other as shown in FIG. 5.

In FIG. 10 is shown a heater section including casting 51, cooling water channels 52, inlet pipe 53, gas chamber 54, and burner 55. The ends of the casting are covered by plates 56, 57 which are adapted by lugs 58 to be connected to adjacent units by a pin 59. The different spacing of the lugs allows relative vertical adjustment of the units. The same construction is used in the burners that are intended to apply the blast for the heat treatment according to the invention. In general, the reheaters need be applied only to the upper surface of the glass, but in those cases in which it is helpful, they may be applied to both surfaces. For example, a sheet of glass which is being lifted vertically out of the furnace will normally have two screens or two preliminary heaters or both as the case may be. Such preheating means will be located by the furnace man in those positions which produce the best results for his particular machine.

In furnaces which produce glass having regular and flat isotherms and not subject to deformation, screen and preheater are needless and the blast of heat may be applied immediately to an isotherm.

An isotherm having been established which is of reasonably simple shape the sheet is given, on both sides, an intense blast of heat, for example a blast of flame, of short duration corresponding to the principles of the invention set forth in the parent case. In short, the blast of heat is so intense that it enables the surface layers of the glass on both sides of the sheet to glide over the inner layers of the glass, which usually remain below the strain point and are not endowed with the ability to move which is imparted to the surface layers by the blast of heat with regard to the intensity of the compression strains thus developed. It is particularly to be observed that this is not a softening of the surface layers, because the entire treatment can be applied and completed at temperatures below those at which the ordinary handling means such as the rollers 40 which support the sheet as it travels from end to end of the machine, and the other ordinary handling means, have no damaging and no noticeable effect upon the surface of the sheet. The sheet arrives at the final station unmarked.

The preferred apparatus for imparting the blast of heat of short duration to the glass includes two burner units 41—41' which correspond in their general aspects to unit 35, each having 6 independently supplied burner sections capable of adjustment with respect to the quantity of heat delivered individually to the surface of the glass; the burners 41—41' are oppositely disposed and play upon opposite faces of the sheet. They are not necessarily disposed along the same lines, because the isotherms on the top and the bottom of the sheet may be different, and each of the burners is laid out along a line following its own isotherm.

A single blast of heat of the type under discussion is ordinarily sufficient, but more than one blast may be applied to the sheet if, under particular circumstances, with a particular type of glass, the results obtained by a blast from a single burner are not sufficient to produce a result of sufficient perfection.

The invention is equally applicable to correct unsymmetrical temperatures resulting from differences in the rate of cooling of different parts of faces of the sheet by applying the intended blast of heat to them unevenly. For example, if opposite sides of the sheet have cooled differently, one may apply a uniform, intense blast of heat along one of the isotherms of one of the sides and an identical blast of heat along the isotherm of identical temperature on the other face, the two sources of the blast of heat being displaced with respect to one another. Furthermore, the sources of the blast of heat may be of different form if the isotherms are of different forms.

It is also within the scope of the invention to place a first heater to provide the brief and intense blast of heat by a single heater to one side of the sheet and apply to the other side a treatment involving a plurality of blasts from a plurality of heating means, thus compensating for the difference in temperature of the upper and lower faces of the sheet.

The applicant has established the fact that when the blast of heat, intense and brief, on one of the faces of the sheet, is not accompanied by a symmetrical application on the other face, it produces, toward the side of the face that has been heated the more, a momentary convexity. The same result follows when two blasts of heat are applied to opposite faces with different intensity. In order to overcome the inconvenience of this temporary bending of the glass into convex shape another important characteristic of the invention provides for regulating the temperature of the blast of heat, intense and brief, as a function of the bending. For example, when the heaters are disposed along an isotherm on a bent sheet their temperature is adjusted as a function of the deformation so that the blast of heat is uniform along the line of the isotherm. Thus, if the apparatus which applies the blast of heat to the glass is of combustion type, emitting flames through a series of burners disposed parallel to the isotherm, the burners are disposed at equal distances from the corresponding points of the face of the sheet after bending has taken place, that is to say that the burners are disposed on a curve that may be parallel to the surface of the bent sheet. On the other hand, if the burners are maintained in a line of their own, the intensity of the flames emitted by each burner may be regulated so as to compensate for the different distances to the sheet. The seeming inconsistency concerning the placing of the burners over a bent sheet is explained by the fact that there may be bending in opposite directions of sheets of glass in different temperature conditions, calling for seemingly opposite treatments of compensation. Whatever may be the cause of the deformation which may appear in a sheet of glass the invention permits the correction or prevention of all such deformations by the means and method herein described. Indeed, the applicant has demonstrated that bending of the sheet can be reduced by applying different treatments to the faces and by heating the convex face more energetically. This example has no limitative character. For example, during the cooling, the glass sheet may take an upwardly concave shape as the top cools faster than the bottom, this curvature reversing after the sheet is completely cooled. The invention may be practically applied by means of heaters capable of applying an intense and brief blast of heat which are composed of a plurality of elements which are independently adjustable in position, or in intensity, or in both so as to give the flames emitted the form or the intensity desired as a function of the points to which they are applied on the sheet.

The sheet 23, after passing the screen 30 is subjected to the action of burners 35, 41—41'; the upper face, which has been more rapidly cooled is submitted to the action of two burners, and the lower face is subjected to the action of a single burner 41' symmetrical or not with 41. The burners have a form which is generally concave on the side toward the furnace and are shown as corresponding in their position to the general paths of isotherms in the glass sheet, upon which they act. The burners are composed of a plurality of elements which are individually adjustable in position and in heating capacity.

Figure 7:
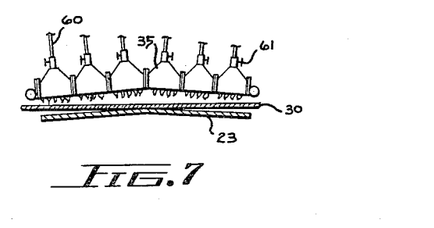
FIGURES 7 and 8 are respectively sections on the lines 7—7 and 8—8 of FIG. 6.
Figure 8:
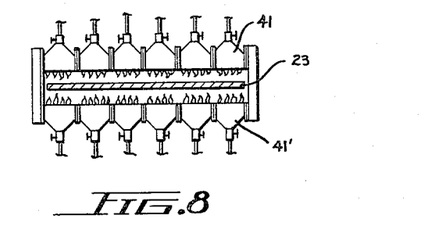

In the form of the invention shown in FIG. 7, the burner 35 has a form slightly arched toward the middle in order to compensate for the bending of the glass sheet upward, which results from the application of the heat to one side only of the glass. In FIG. 8, the glass is flat and the buners are parallel to its faces.

Figure 1:
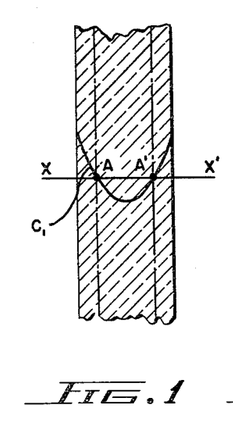
FIGURE 1 is a diagrammatic section through a sheet of glass which has been cooled naturally in free air, the distribution of the resultant stresses being indicated.

FIGURE 1 shows the known distribution of the stresses in the different layers of a sheet of glass after this has been completely cooled naturally without the interposition of the treatment according to the invention. This distribution may be observed, for example, with the Babinet compensator. In relation to an axis X—X' perpendicular to the surfaces of the glass sheet and indicating the axis of the stresses of zero value, the ordinates corresponding to tensions are carried downwardly and those which correspond to compressions are carried upwardly. The standard curve $C_1$ which represents the intensity of the stresses in each layer of the thickness of the sheet generally assumes a parabolic form and intersects the axis X—X' of the zero stresses at two points A and A' in such manner that it is possible to imagine the sheet divided into three parallel zones: two external zones and one internal zone, such that every point of an external zone is subjected to a compressive stress, while every point of the internal zone is subjected to a tensile stress.

The curve $C_2$ (FIG. 2) and the curve $C_3$ (FIG. 3) show, by way of non-limitative examples, two possible distributions of the stresses in a sheet of glass which can be produced in a sheet by the treatment of the invention.

Figure 2:
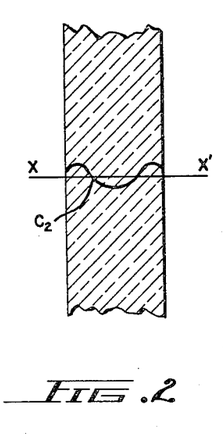
FIGURES 2 and 3 are similar views of sheets which have been treated in accordance with the present invention.
Figure 3:
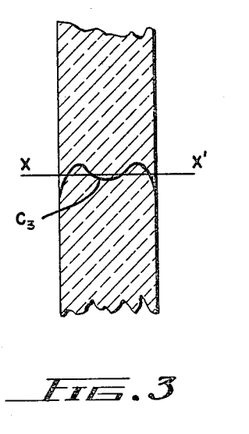

It will be seen that, as compared with the curve of FIGURE 1, the curves $C_2$ and $C_3$ show a considerable decrease in the compression (curve $C_2$) and even a slight tension (curve $C_3$) in the surface layers. The underlying layers, which are not affected or are less affected by the treatment, have a certain compression in the curves $C_2$ and $C_3$ which is higher than that in the surface layers. The tension at the core, owing to the fact that it balances the reduced compressions in the external layers, is itself also attenuated. Finally, the curves (such as $C_2$—$C_3$) seen in the Babinet compensator have a double "camel-humped" curvature. This is a new type of glass which is not like tempered nor like annealed glass.

Owing to the decrease of the surface compression, this stress curve is even capable of becoming a slight tension. By the new process it is possible to obtain, inter alia, sheets of glass which are particularly simple to cut, a result which has hitherto been sought by means of the intricacies of the annealing treatment.

I have also discovered that the application of the treatment according to the invention is capable of giving to the distribution of the stresses throughout the finished product the homogeneous character which is also usually expected of the annealing treatments.

It is to be noted that the process according to the invention, while enabling a glass to be obtained which cuts well and in which the stresses are low and distributed homogeneously, nevertheless differs essentially from the annealing treatment.

Actually, the treatment according to the invention is of an extremely short duration, of the order of one or a few seconds; the rise in temperature which results therefrom is localized in the surface layers; after stopping the extremely powerful and brief heat blast which has caused this rise in temperature, the cooling may be carried out as desired, apart from the normal precautions to be taken against breakage by temporary strains. In contradistinction to this, as pointed out above, the annealing treatment is of a considerably longer duration; it necessitates the entire mass of the object being brought to an initial uniform temperature higher than the tension temperature (strain point), following which the cooling down to this temperature must be conducted in a controlled manner.

In carrying the invention into effect, the principal factors employed, namely the temperature of the glass when the treatment is applied within the limits above defined, the intensity of the heat blast and the time during which it is applied, will naturally be regulated according to the properties which the final object is to have.

In all cases, the thermal shock that is the actual effect of the application of the heat blast according to the invention, is characterized by its suddenness, that is to say, both by the high value of the number of calories applied to the surface of the glass and by the briefness of this application.

Thus, a sheet of drawn glass having a thickness of 5 mm., and showing after complete cooling a stress curve in the Babinet compensator, of the type shown in FIGURE 1, has been subjected, after bringing the glass to a temperature of approximately 420° C., to a heat blast of 20 calories per sq. cm. per second, under the action of a gas burner, for a period of one and a half seconds. After this treatment, and cooling to room temperature rapidly with regard only to temporary stresses, when the sheet is examined in the cold with the Babinet compensator, it shows only insignificant stresses distributed in accordance with a curve having a double curvature, of the type shown in FIGURE 2.

The treated glass differs from other glass in the shape of the internal stress curve, and it can be identified by determining its internal stress curve. Its distinguishing characteristic is the camel-backed or compound curve of FIGS. 2, and 3. This curve is not found in annealed or tempered glass or in glass cooled naturally. This treated glass is of great value and is produced at less cost than competitive glasses produced by the complex methods of the prior art. It may be used in place of annealed glass for many uses. It can be superior to annealed glass in the cases where a special mechanical resistance is required because of the compression strains that remain in the glass.

Among the accomplishments of this invention are the following:

The general process of the parent case has been applied to the manufacture of sheet or plate glass which is continuously extracted from a melting furnace. The faces of the glass sheet have been submitted to the action of an intense and brief blast of heat as provided for in the parent case, after determining the points at which the blast should be applied and the intensity which is to be used at each point, the blast intensity varying from point to point as a function of the distribution of temperatures in the surface of the glass sheet and as a function of the deformation of the sheet.

A particularly valuable form of the invention involves the application of the blast of heat to an isotherm in the surface of the sheet or approximately to such an isotherm and the adoption of methods which insure the equal application of heat to all parts of the sheet.

Another method of accomplishing the process is involved in which the blast of heat, intense and brief, is applied along any selected path, for instance, across a path perpendicular to the direction of motion of the sheet and is regulated in temperature as a function of the temperature of the different points of application.

In applying the invention to the continuous manufacture of a glass sheet by drawing, rolling or otherwise extracting it from a furnace, there are many problems to be overcome which arise from the nature of the process. The glass is extracted in a mass that is thinned between rollers which tend to cool the surfaces of the sheet.

This is illustrated in FIG. 9.

It is generally difficult to apply the new process to the sheet as it issues from the rolls 24—25, since its surface glass is in different states of temperature and therefore an object of the invention is to regularize the isotherms in a sheet of hot glass from a furnace.

Figure 4:
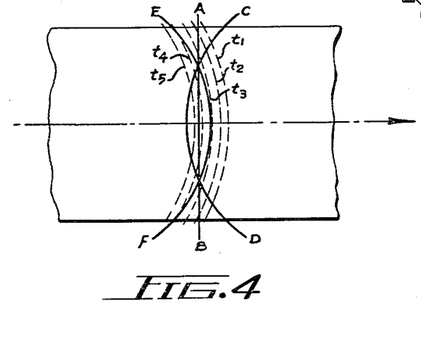
FIGURE 4 is a schematic diagram showing various possible lines of application of heat to the surface or surfaces of a moving sheet of glass after issuing from a melting furnace.

In FIG. 4 a glass sheet is indicated by numeral 24 and its direction of motion is shown by the arrow. Isotherms $t_1$, $t_2$, $t_3$, $t_4$ and $t_5$ have been shown arbitrarily in dotted lines on the surface of the sheet, corresponding respectively to temperatures $t_1$, $t_2$, $t_3$, $t_4$ and $t_5$ in one of the faces of the sheet at a given instant. According to one of the methods of applying the invention described generally hereinabove, the heat may be applied along an isotherm, for example along isotherm $t_3$, and the heat may be applied uniformly throughout the length of that line. It is again to be noted that these lines are the central lines of zones of limited width to which the heat is applied.

In another method of accomplishing the invention, heat is applied not along an isotherm, but across a straight line A—B perpendicular to the direction of motion of the sheet, but in this case, the intensity of the heat may be regulated as a function of the temperature of different points on the line A—B so as to produce a uniform temperature at all points on the line. Furthermore, the same method of applying the invention may be used in applying the heat to any chosen line, for example, C—D, E—F, it being understood that the intensity of the heat applied will vary along the line.

Another mode of applying the invention involves the case where the two faces of the sheet of glass in movement are cooled at an equal rate and the blast of heat is applied equally and symmetrically to both sides.

In another method of applying the process where the two sides of the sheet are not cooled at the same rate, the invention is applied unsymmetrically and as a function of the temperature existing in opposite sides of the sheet.

In another method of application of the process a first heating unit applies an intense and brief blast of heat to one of the faces and thereafter two such heaters work on opposite sides of the sheet more or less symmetrically.

In one of the methods of carrying out the invention the heaters are adjusted as to their intensity as a function of the deformations which are capable of affecting the sheet, whatever may be the cause thereof and even to the extent of correcting those deformations by the application of this heat. This may be accomplished, for example, by the regulation of the intensity of the first blast of heat or by regulation of the relative positions of each element of the heater with respect to the point of application of the blast of heat issuing therefrom, or by the application of both modes of regulation together. Yet another method of applying the invention involves the use of a plurality of elements which are separately adjustable either in position or in intensity so as to give to the blast of heat emitted by them the form or the intensity desired as a function of the temperature existing in the points of application.

A valuable concept of the invention lies in this, that before the passage of a face of the sheet into the zone of intense heat omitted by the heaters, the curve of the isotherms is modified by thermal insulation and/or by auxiliary heating.

This particular form of the invention is useful in altering the isotherms in order to give them a form approximating straight lines perpendicular to the direction of motion of the sheet, the sheet being, in this case, thereafter submitted to the action of the heaters which apply the essential thermal treatment.

The strain curve in the treated glass is clearly distinguishable from the curves of annealed and of tempered glass. Tempered glass has a strain curve similar to FIG. 1, or worse, indicating great differences in internal strains. Annealed glass has a strain curve which approaches the straight if the annealing is perfect. The curve of the treated glass is of the type shown in FIGS. 2 and 3 and has no counterpart in any known product so far as known.

Without departing from the scope of the invention, the means and devices by which the heat blast is applied to the glass may be of any desired nature; radiation, convection and dielectric losses can be used either separately or in combination, and also all other suitable heating means, provided that the use of these heating systems is in accordance with the highly preferential heating of the surface layers of the treated objects.

In certain embodiments of the invention, it will be possible to obtain the desired modification of the value of the stresses and/or of their distribution, by a repeated application of the treatment in the form of several separate successive thermal shocks.

As many apparently widely different embodiments of the invention may be made without departing from the spirit and scope thereof, it is to be understood that the invention is not limited to the specific embodiments.

What is claimed is:

1. A glass article in which the cross sectional stress curve presents two maxima of compression occurring inside the surfaces of the glass.

2. Flat glass in which the cross sectional stress curve presents two maxima of compression occurring inside the surfaces of the glass, which fragments into numerous small pieces on rupturing, and which has a thickness of each compression zone greater than 0.42 of the half thickness of the glass.

3. Flat glass according to claim 2 in which the thickness of the compression zone is about 0.45 of the half thickness of the glass.

4. Stressed flat glass which can be cut, in which the central portion of the cross sectional stress curve shows tension not greater than ½ fringe per cm. of glass traversed by the light, two maxima of compression occurring inside the surfaces, and ends located between ½ fringe of tension and one fringe of compression, and in which stresses when the examination with the polariscope is effected perpendicularly to the surfaces are not over ¼ fringe.

5. The method of making stressed glass that can be cut that comprises bringing glass having mild surface compression, that cannot be cut without risk of breakage, to a temperature below the strain point and in any case which does not exceed it appreciably, applying to the surface thereof a brief and intense blast of heat, thereby raising the temperature of the surface glass above the strain point, inducing gliding of the outer on the inner layers and reducing the stress at the surface, terminating the heating before the center of the glass substantially exceeds the strain point and before the surface glass attains the deformation point, and cooling the glass.

6. The method of making stressed flat glass capable of being cut, having stresses visible by polarized light passing through the broad surfaces, which are not over ¼ fringe, that comprises bringing mildly tempered glass having not over 2 fringes of compression per cm., of glass transversed by polarized light passing parallel to the broad surfaces, to a temperature below the strain point, applying to the surfaces thereof a brief and intense blast of heat by means of a hot gas, thereby raising the temperature of the surface of the glass above the strain point, inducing gliding of the outer on the inner layers and reducing the stress at the surface, terminating the heating before the central part of the glass substantially exceeds the strain point, before the surface attains the deformation point, and when the change in the stresses has been such as to result in a final surface compression lower than 1 fringe and a central extension lower than ½ fringe.

7. The method of making highly stressed flat glass that comprises bringing glass which has been subjected to a tempering treatment capable of developing surface compressions equivalent to more than 3 fringes per cm. of glass traversed by polarized light, viewed in cross section, to a temperature below the strain point, subjecting its surfaces to intense and brief heating thus raising the temperature of the surface layers above the strain point, introducing stresses which cause the outer layers to glide over the inner, reducing the internal tension and thickening the layers under compression until they are greater than 0.42 of the half thickness of the glass, ending the heating before the central layers substantially exceed the strain point and before the outer layers attain the deformation point, and cooling the glass.

8. A method of making flat glass having stresses less than ¼ fringe under polarized light viewed perpendicularly to the faces thereof, which comprises forming a sheet from a mass of molten glass, reducing the rate of cooling of faster cooling parts of the sheet to substantially that existing in the slower cooling parts of the sheet, thereby establishing approximate rectilinear isotherms extending from one edge to the other of the sheet, cooling the glass below the strain point, applying a blast of hot gas to both faces of the sheet along corresponding isotherms and ending it before the surface reaches the deformation point and the core passes materially beyond the strain point, and cooling the glass rapidly while taking the necessary precaution to avoid breakage by temporary strains.

9. The method of making, and releasing the strains in, a glass sheet that comprises forming a sheet of glass continuously from a mass of molten glass, moving the sheet through a cooling range and thus bringing it to a temperature not exceeding substantially the strain point, such temperature involving differences in the degree of temperature at different locations transversely of the sheet, reheating parts of cooler degree to approximate equality with other parts of the moving sheet, and subjecting the surface of the sheet to a brief, intense heating along a path approximating an isotherm and terminating the heating before bringing the temperature of the internal parts of the sheet materially above the strain point or the outer layers above the point at which they can be marred by the usual means employed for handling the glass.

10. A method for controlling the value and the distribution of the permanent stresses in a glass article which has been submitted to a cooling effect generating permanent stresses, which consists in submitting the external layers of said article, when the temperature of the internal layers is lower than the strain point of the glass, and in any case does not exceed it materially, to a heating action of sufficient intensity to generate in these external layers, by thermal expansion, compression stresses capable of causing the slipping of these external layers on the relatively more rigid internal layers, said heating treatment being of sufficiently short duration to avoid bringing the internal layers to a temperature appreciably higher than the strain point, and the external layers above the deformation point, and then cooling the glass article.

11. The method of making, and releasing the strains in, a glass sheet that comprises forming a sheet of glass continuously from a mass of molten glass, moving the sheet through a cooling range and thus bringing it to a temperature below the strain point and, in any case, not exceeding substantially the strain point, subjecting the surface of the sheet to brief intense heating of intensity sufficient to allow the surface glass while still elastic to glide on an inner layer, and ending the heating before the internal parts of the sheet attain a temperature materially above the strain point and before the surface glass can be marred by the usual means for handling the glass.

12. The method of making, and releasing the strains in, a glass sheet that comprises forming a sheet of glass continuously from a mass of molten glass, moving the sheet through a cooling range and thus bringing it to a temperature below the strain point and, in any case, not exceeding substantially the strain point, heating the surface of the sheet to a temperature range below the deformation point at which it can move with respect to an inner layer of the sheet and terminating the heating before the strain point of such inner layer is materially exceeded.

13. A process according to claim 10 characterized in that before the passage of a face of the sheet in front of the brief and intense heat blast the curvatures of laterally extending isotherms are modified by applying heat of irregular intensity along a line transverse to the line of motion of the sheet.

References Cited in the file of this patent

UNITED STATES PATENTS

| 1,447,702 | Whittemore | Mar. 6, 1923 |
| 1,469,383 | Crowley | Oct. 2, 1923 |
| 2,093,040 | Eckert | Sept. 14, 1937 |
| 2,244,715 | Long | June 10, 1941 |
| 2,311,846 | Littleton et al. | Feb. 23, 1943 |
| 2,539,159 | Peiler | Jan. 23, 1951 |
| 2,674,067 | Reggiani | Apr. 6, 1954 |
| 2,897,632 | Fowler et al. | Aug. 4, 1959 |

FOREIGN PATENTS

| 778,338 | France | Dec. 22, 1934 |
| 831,122 | France | May 30, 1938 |
| 469,994 | Great Britain | Aug. 3, 1937 |
| 606,756 | Great Britain | Aug. 19, 1948 |